Sept. 19, 1939.   J. B. DEARING   2,173,228
GYROSCOPIC DEVICE
Filed Oct. 29, 1937

Remote Indicator

Inventor
John B. Dearing
By
Attorney

Patented Sept. 19, 1939

2,173,228

UNITED STATES PATENT OFFICE 2,173,228

GYROSCOPIC DEVICE

John B. Dearing, Ben Avon, Pa., assignor to Radio Corporation of America, a corporation of Delaware Application October 29, 1937, Serial No. 171,727

2 Claims. (Cl. 33—204)

My invention relates to a directional gyroscopic motor which is arranged to remotely indicate. More particularly, my invention is a gyroscopic directional device which operates as a servo mechanism.

There are numerous applications of the directional gyroscope to aircraft indicating instruments. The conventional arrangement of the directional gyroscope is one in which a small rapidly revolving rotor is mounted within gimbal rings which permit the mounting to rotate freely in all directions, and at the same time permit a rigidity along the rotor axis so that the direction of the rotor axis remains substantially constant with respect to a reference line. In such directional gyros, the indicating scale is fixed on the instrument. In many cases, a remote indication or a remote control is desired.

Since the gyroscopic rotor is a very small device operated at relatively low power, it is not practical to apply substantial loads to the instrument because of the reactive effect of such loads. I propose to use the directional gyro as a servo mechanism in which a minimum or negligible amount of reaction is applied to the gyroscopic device.

One of the objects of my invention is to provide means wherein a remote indication may be given of the operation of a directional gyroscopic device. Another object of my invention is to provide means whereby a directional gyroscope may be used as a servo mechanism. A further object of my invention is to provide means whereby remote control or remote indication may be effected by a low reactance coupling to a gyroscopic device.

Figure 1:
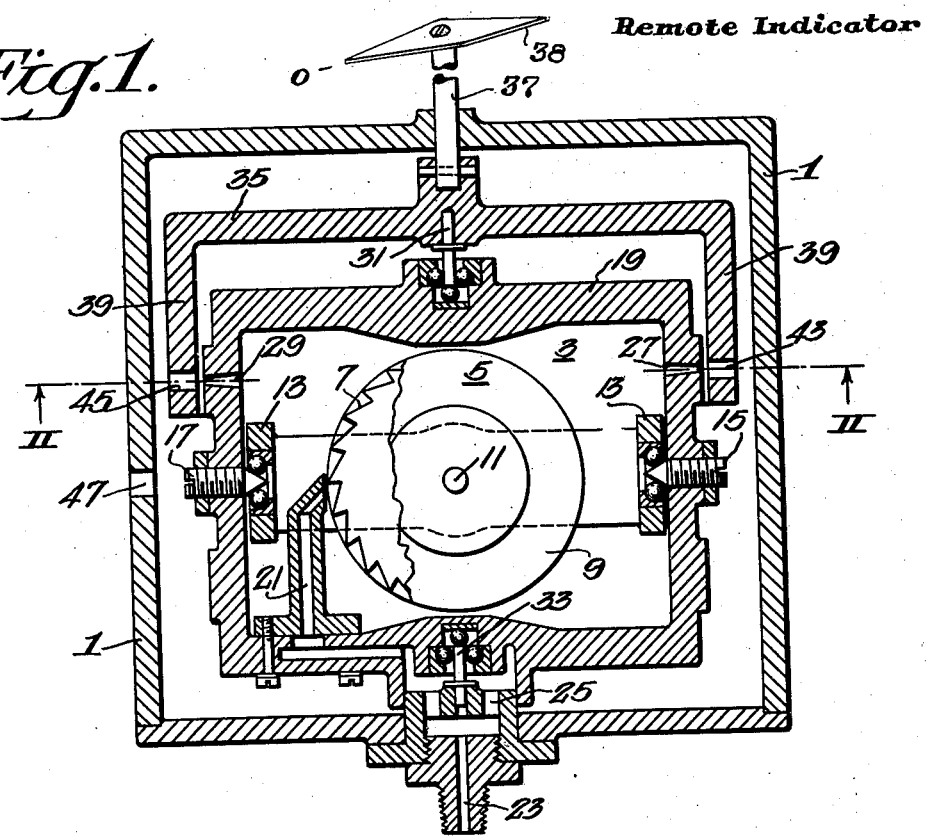
Figure 2:
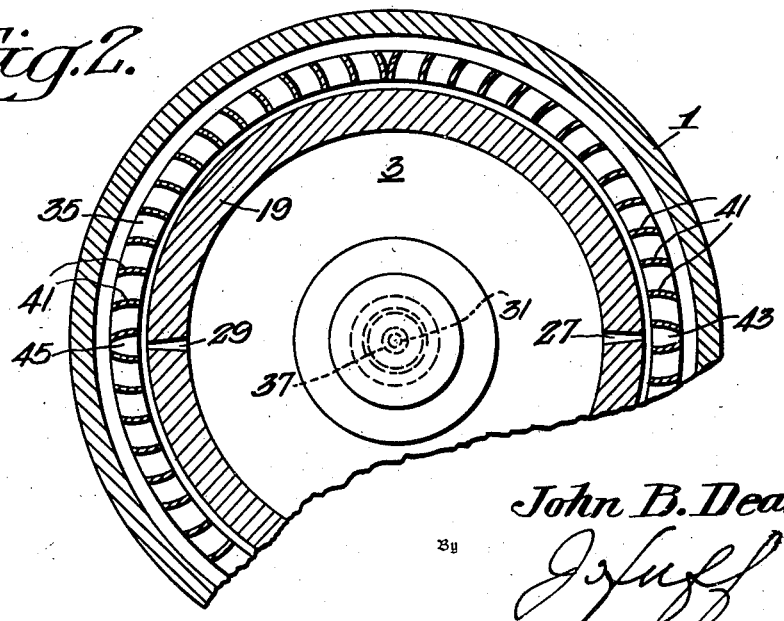

My invention may be best understood by reference to the accompanying drawing, in which:

Figure 1 is a horizontal view, partly in section, of one embodiment of my invention, and Figure 2 is a sectional view along the line II—II.

Referring to Fig. 1: Within a housing 1 is rotatably mounted a gyroscopic device 3. The gyroscopic device may be operated by compressed air or a vacuum. The gyroscopic device consists of a rotor 5 which includes buckets 7 whereby it may be driven at high speed. The buckets 7 terminate in flanges 9 which assist in maintaining the rigidity of the gyroscopic axis 11. The axis of the rotor is horizontally mounted in a suitable ring 13 which is supported by a pair of trunnions 15—17. The trunnions are mounted in a hollow cylindrical member or chamber 19 at right angles to the rotor axis 13.

The hollow cylindrical member 19 has bolted within it a nozzle 21 from which the compressed air is directed into the buckets 7. The air is fed to the nozzle through a fitting 23 which is connected to the nozzle through a suitable communicating channel 25. The hollow cylindrical member 19 includes a pair of exhaust ports 27—29 which are spaced diametrically opposite each other. These ports are preferably tapered so that they are also effective as air nozzles.

The hollow cylindrical member 19 is vertically supported by suitable trunnions 31—33. The lower one 33 of these trunnions is mounted in the lower portion of the housing 1, while the upper trunnion 31 is mounted in a rotatable member 35. The rotatable member is mounted on a shaft 37 which has its bearing in the upper portion of the housing 1. The rotatable member includes a downwardly extending skirt 39. The lower portion of this skirt includes vanes 41 which are positioned substantially opposite the exhaust air ports 27—29. The vanes 41 are arranged to extend in opposite directions in each quadrant of the skirt whereby pairs of vanes extending in opposite directions form diagonally opposite pairs of symmetrical openings 43, 45 in the skirt 39. The housing 1 may include one or more orifices 47 through which the used air may be exhausted.

The operation of the device is substantially as follows: Compressed air, which is fed from any suitable source through the fitting 23, passes through the channel 25 to the air nozzle 21. The compressed air from the nozzle drives the gyroscopic rotor 5 in a clockwise direction whereby the rotor assumes a rigidity in accordance with gyroscopic principles which are well known to those skilled in the art. The compressed air within the hollow cylinder 19 escapes through the ports 27—29. These ports, as previously described, act as air nozzles with respect to the vanes 41 in the skirt of the rotatable member. The effect of the compressed air from the pair of nozzles is to turn the rotatable member until the pairs of vanes forming the symmetrical openings 43—45 in the skirt are directly opposite the pair of air nozzles.

If the aircraft or the like, on which the housing is fixedly mounted, turns from a desired course, the hollow cylindrical member 19 will maintain its position in accordance with the well known operation of a directional gyroscope. However, the rotatable member will then be momentarily displaced with respect to the pair of air nozzles 27—29, which then direct the compressed air against the vanes 41 in the skirt of the rotatable member. This will cause the rotatable member to move clockwise or counterclockwise, as the case may be, until the symmetrical openings 43—45 in the skirt are directly opposite the air nozzles 27—29. Thus the rotatable member 35 is made to constantly follow, or keep in step with, the position of the diametrically opposite air nozzles 27—29. Since the operation of the rotatable member depends upon equal and opposite air blasts, it will be apparent that there will be substantially no reactive effect upon the gyroscopic rotor. It should also be understood that the vanes 41 in the rotatable member 35 are sufficiently spaced from the air nozzles 27—29 so that the reaction is substantially on the air blast itself rather than upon the hollow cylindrical member 19. That is, the coupling between the rotatable member and the cylindrical member may be said to have low reactance. It should also be understood that the shaft 37 which is attached to the rotatable member may be extended to operate any remote indicator or device, such as a pointer 38 or the like. The shaft may obviously include a flexible portion.

Thus I have described a gyroscopic directional device which may be used as a servo mechanism. It is also apparent that the device which I have described will exert a minimum of reactive force on the gyroscopic device itself. While I have used the expression "compressed air" in describing the device, the operation is essentially the same when a vacuum is applied in place of the compressed air. The foregoing arrangement may be adapted to numerous types of remote control or remote indication of the operation of a directional gyroscope.

I claim as my invention:

1. A gyroscopic device including a casing forming a closed chamber, a directional gyroscope mounted for two degrees of horizontal freedom within said chamber, means mounting said casing for pivotal movement about a substantially vertical axis, means introducing compressed air into said chamber to spin the gyro rotor, there being an aperture in said casing forming an air jet exhausting said air from the casing, a rotatable member mounted adjacent said chamber coaxial thereof, and means carried by said rotatable member and coacting with said jet whereby the member is stabilized in azimuth by the casing.

2. A gyroscopic device including a casing forming a closed chamber, a directional gyroscope mounted for two degrees of horizontal freedom within said chamber, means mounting said casing for pivotal movement about a substantially vertical axis, means introducing compressed air into said chamber to spin the gyro rotor, there being an aperture in said casing forming an air jet exhausting said air from the casing, a rotatable member mounted adjacent said chamber coaxial thereof, and means carried by said rotatable member including a skirt portion having vanes arranged in opposite directions in each quadrant of said skirt and adapted to coact with said jet whereby the member is stabilized in azimuth by the casing.

JOHN B. DEARING.